US008219075B2

(12) United States Patent
Voss

(10) Patent No.: US 8,219,075 B2
(45) Date of Patent: Jul. 10, 2012

(54) METHOD FOR TESTING PERFORMANCE OF A MOBILE TELECOMMUNICATIONS NETWORK

(76) Inventor: Juergen Voss, Wiesbaden (DE)

( * ) Notice: Subject to any disclaimer, the term of this patent is extended or adjusted under 35 U.S.C. 154(b) by 1279 days.

(21) Appl. No.: 11/218,187

(22) Filed: Sep. 1, 2005

(65) Prior Publication Data

US 2007/0049266 A1    Mar. 1, 2007

(51) Int. Cl.
*H04W 24/00* (2009.01)
(52) U.S. Cl. .................................................. 455/423
(58) Field of Classification Search .................. 455/423, 455/422.1, 424, 425, 67.11, 67.13, 67.15, 455/67.7
See application file for complete search history.

(56) References Cited

U.S. PATENT DOCUMENTS

| 7,006,841 | B2* | 2/2006 | Monogioudis et al. | 455/522 |
|---|---|---|---|---|
| 7,203,512 | B2* | 4/2007 | Jeong et al. | 455/522 |
| 2002/0045451 | A1* | 4/2002 | Hwang et al. | 455/442 |
| 2002/0077140 | A1* | 6/2002 | Monogioudis et al. | 455/522 |
| 2005/0063339 | A1 | 3/2005 | Jeong et al. | |
| 2005/0118993 | A1* | 6/2005 | Roux et al. | 455/423 |
| 2007/0206530 | A1* | 9/2007 | Lee et al. | 370/329 |

FOREIGN PATENT DOCUMENTS

| CH | EP1335526 A1 | 8/2004 |
|---|---|---|
| FR | EP1335537 A1 | 8/2003 |
| WO | WO03096729 A1 | 11/2003 |

OTHER PUBLICATIONS

Agilent OSS UMTS Network and Service Assurance White Paper: An Introduction to UMTS and the Implications on OSS. (c) Agilent Technologies, Inc. Feb. 1, 2004.
ETSI TS 102 250-2 VO.2.2 (Feb. 2004) Technical Specification. Speech Processing, Transmission and Quality Aspects (STQ); QoS aspects for popular services in GSM and 3G networks; Part 2: Definition of Quality of Service parameters and their computation. (c) ETSI 2004.

* cited by examiner

*Primary Examiner* — Thang Tran
*Assistant Examiner* — Huy D Nguyen
(74) *Attorney, Agent, or Firm* — Matthew A. Pequignot; Pequignot + Myers LLC

(57) ABSTRACT

A method for testing performance of a mobile telecommunications system includes the steps of using a link probe for coupling a signaling analyzer to a mobile telecommunications link between a wireless network controller and a wireless transmission/reception station, collecting signaling information with the signaling analyzer for the predetermined telecommunications activities coupled through the mobile telecommunications link, and analyzing collected signaling information from the step of collecting to determine performance values for the mobile telecommunications link.

12 Claims, 3 Drawing Sheets

METHOD FOR TESTING PERFORMANCE OF A MOBILE TELECOMMUNICATIONS NETWORK

FIELD OF THE INVENTION

The present invention generally relates to testing the performance of mobile telecommunications networks, and in particular to capturing signaling information from the radio access link of such networks for performing failure analysis.

BACKGROUND OF THE INVENTION

The nature of mobile telecommunications systems is changing under the ever present influences of competition and improving technology. New digital services drive customer demand and mobile service providers are transitioning to faster digital networks to increase their bandwidth capacity while reducing bandwidth costs. Of course, these transitions have the added burden of maintaining or even improving current service levels during the transitional steps.

The original digital mobile networks focused on voice transmissions. Then, low bandwidth digital services such as text messages and e-mail were added. Currently, systems are being upgraded for high bandwidth multimedia applications. Throughout this transition, service providers need to maintain the same service availability and service quality that their customers have come to expect, or risk losing market share.

FIGS. 1 and 2 are an example of the evolution of one such GSM mobile network from a circuit switched voice system to a packet switched multimedia network. FIG. 1 shows a network 10, which has been upgraded from a circuit switched voice network with the addition of packet data transmission capability. The original network connected to a Public Switched Telephone Network (PSTN) 12, and included a plurality of Mobile Switching Centers (MSC) 14 which routed calls throughout a Base Station Controller (BSC) 16 and a Base Transmission Station (BTS) 18 to wireless mobile devices 20. Roaming users are accommodated by recording their presence in an (HLR) 22.

General Packet Radio Service (GPRS) was added to the original network by means of a (GGSM) 24 which made direct connection to a packet data network (PDW) 25. Packet data is coupled to BSC 16 through a Serving GPRS Support Node (SGSN) 26. This overlay data network effectively increased the bandwidth of the core network to allow high speed data transfer with an 'always on' connection. The restricting factor for end-to-end speech data transfers became the radio access network.

FIG. 2 shows the next step of transition with the addition of a high speed wireless interface in the form of wide band code division multiple access (WCDMA). This new interface includes a multiplicity of secondary transmission nodes 30 (known as Node B), which are typically co-located on existing BTS 18 towers. Signals are coupled to secondary nodes 30 through Radio Network Controllers (RNC) 32 which can handle more than one secondary node 30. Co-location of secondary nodes 30 on BTS 18 is possible because secondary nodes 30 work in a higher frequency band. Unfortunately secondary nodes 30 have a shorter signal range and typically enjoy less than optimal positioning on BTSs 18, which increases geographic coverage issues for service providers.

It should be noted that each of the different inter nodal links used in the described networks has a different functionality and uses a different signaling protocol that is handled by each intervening node. These different protocols add complexity to the networks, which makes fault analysis very difficult. For this reason, signaling analyzers have been developed to record the various signaling information in a database to thereby allow careful analysis of the cause of communications problems.

The new high speed wireless interface and the described co-location and coverage issues will require exceptional troubleshooting capability for the new wireless interface links. This capability will require extensive visibility of the signaling for those links and will also require network wide access to confirm the root cause of communications failures.

SUMMARY OF THE INVENTION

Accordingly one embodiment of the present invention covers a method for testing performance of a mobile telecommunications system, comprising the steps of using a link probe for coupling a signaling analyzer to a mobile telecommunications link between a wireless network controller and a wireless transmission/reception station, collecting signaling information with the signaling analyzer for the predetermined telecommunications activities coupled through the mobile telecommunications link, and analyzing collected signaling information from the step of collecting to determine performance values for the mobile telecommunications link.

The method may further comprise the step of performing predetermined telecommunications activities within a geographic area serviced by the mobile telecommunications link, wherein the step of analyzing includes using collected signaling information corresponding to the predetermined telecommunications activities. The predetermined telecommunications activities may include telephony or short message service (SMS), and a determined performance value may include service accessibility in the presence of network access. A determined performance value may include a probability that a mobile device has network access.

The method may further comprise the step of recording collected signaling information in a telecommunications signaling analyzer database along with other signaling information from the mobile telecommunications system for the predetermined telecommunications activities. The method may still further comprise the step of analyzing recorded signaling information from the database to determine end-to-end performance values for the predetermined telecommunications activities. The predetermined telecommunications activities may include telephony, wherein a determined performance value includes measuring setup time. A determined performance value may include end-to-end speech quality. A determined performance value may include a probability that service access, once obtained, will continue to be provided under predetermined conditions for a predetermined time duration.

The predetermined telecommunications activities may include short message service (SMS), and a determined performance value may include a time delay between sending a short message and receiving an acknowledgement from a short message center. A determined performance value may include an end-to-end delivery time between the sending of a short message and receipt of that message by a target mobile device, assuming that the target mobile device is ready to receive. A determined performance value may include a probability that SMS messages will be delivered to a target mobile device under predetermined conditions.

The predetermined telecommunications activities may include multimedia message service (MMS), and a determined performance value may include a probability that an MMS message can be sent by a subscriber when requested in the presence of network access. A determined performance value may include an elapsed time between a subscriber sending an MMS message and completion of data transfer for this MMS message.

The method may further comprise the step of determining a root cause of failure for failed telecommunications activities from collected signaling information. The method may further comprise the steps of recording communications data corresponding to the signaling information from the performed telecommunications test activities and using recorded communications data to determine further performance values.

The collected signaling information may include one or more of the following: asynchronous transfer mode (ATM) signals; QSALL signals between a WCDMA Node B and a radio network controller (RNC); ALCAP signals between a WCDMA Node B and an RNC; NBAP signals between a WCDMA Node B and an RNC; RRC signals between a mobile device and an RNC; MM signals between a mobile device and a wireless network; CM signals between a mobile device and a wireless network; and application signals between a mobile device and an application server.

BRIEF DESCRIPTION OF THE DRAWINGS

The present invention is illustratively shown and described in reference to the accompanying drawings, in which.

DETAILED DESCRIPTION OF THE DRAWINGS

Figure 1:
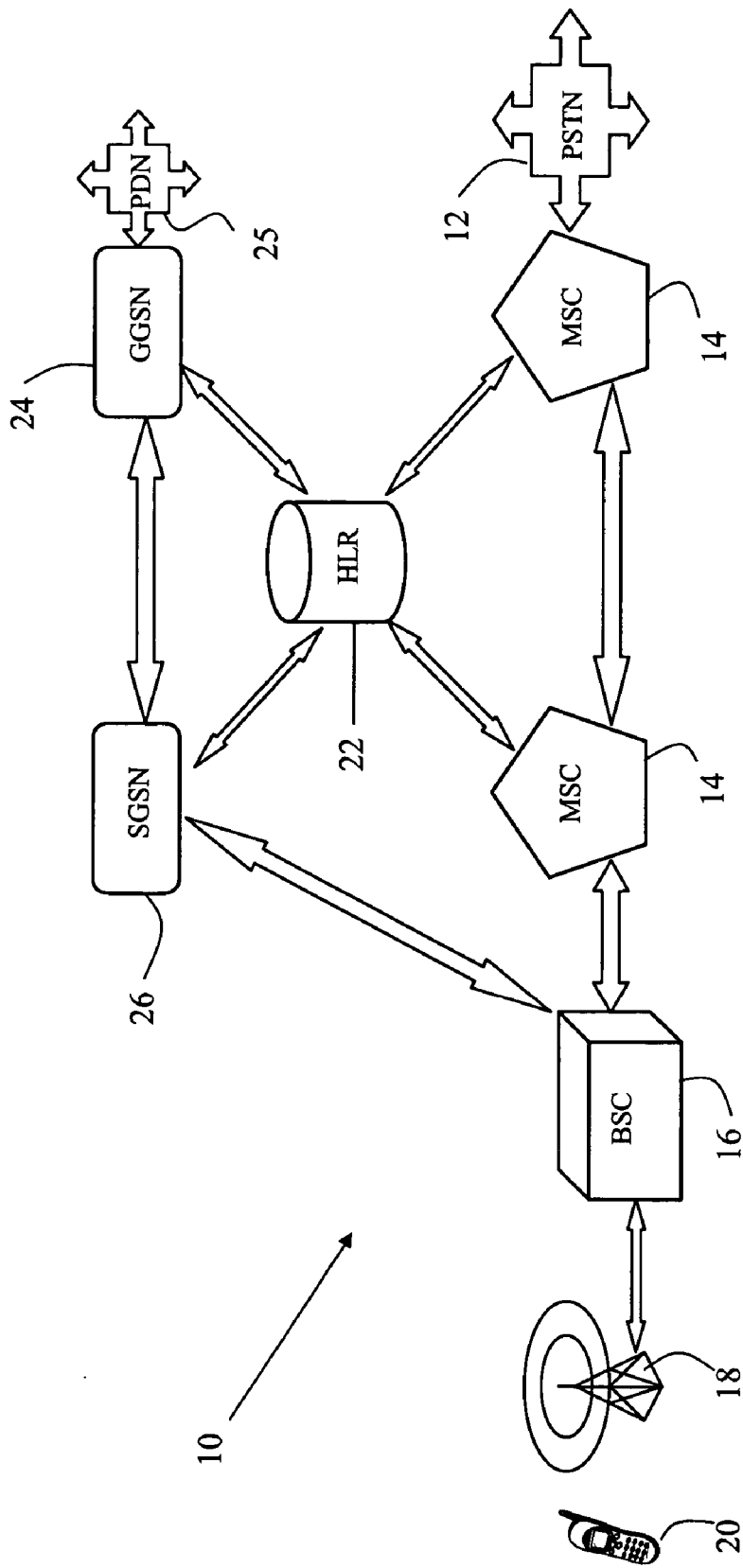
FIG. 1 is a block diagram of a prior art GSM mobile telecommunications system having GPRS data network upgrade.
Figure 2:
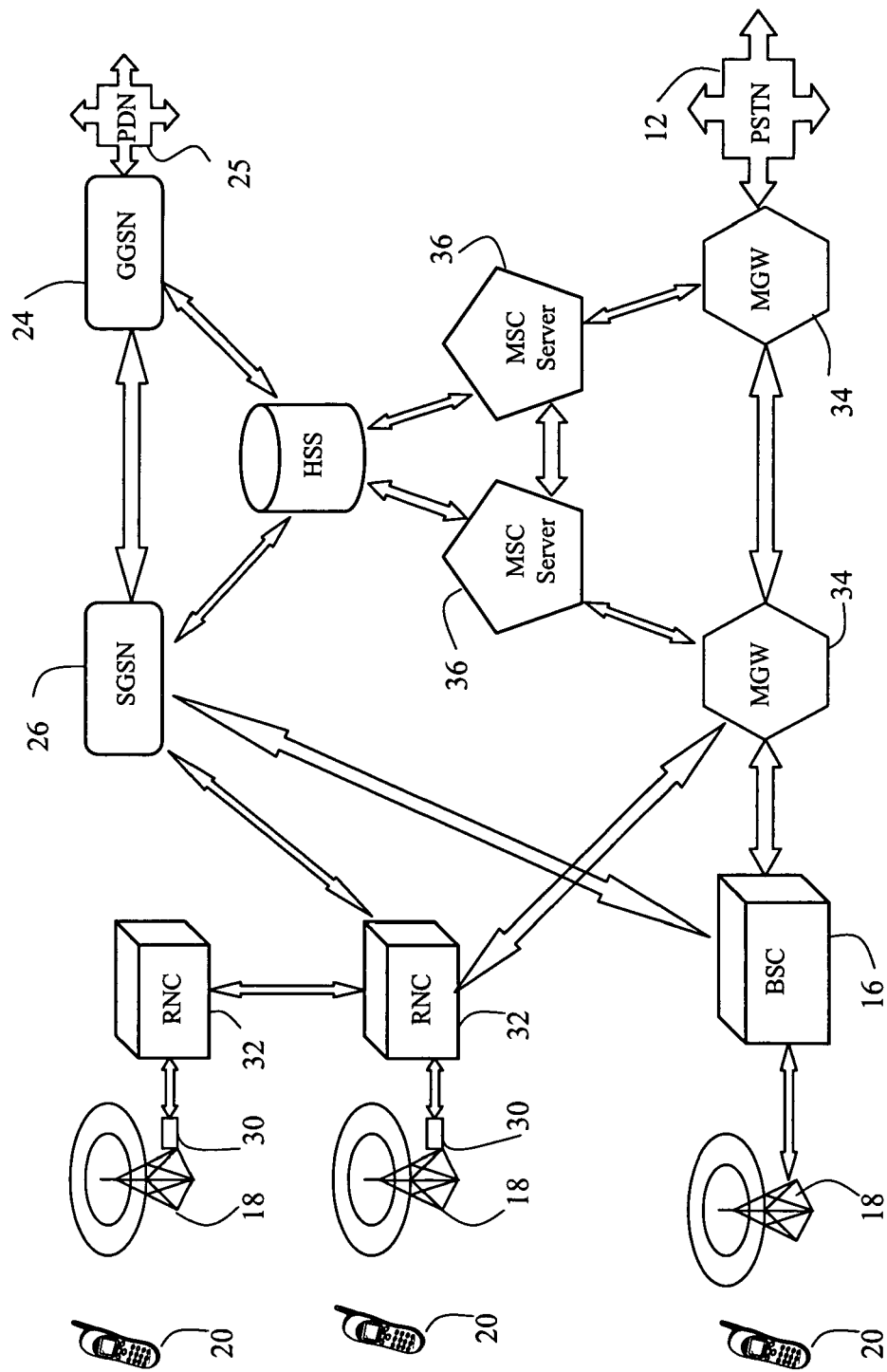
FIG. 2 is a block diagram of a prior art GSM mobile telecommunications system which has been upgraded with the addition of a wideband code division multiple access air interface.
Figure 3:
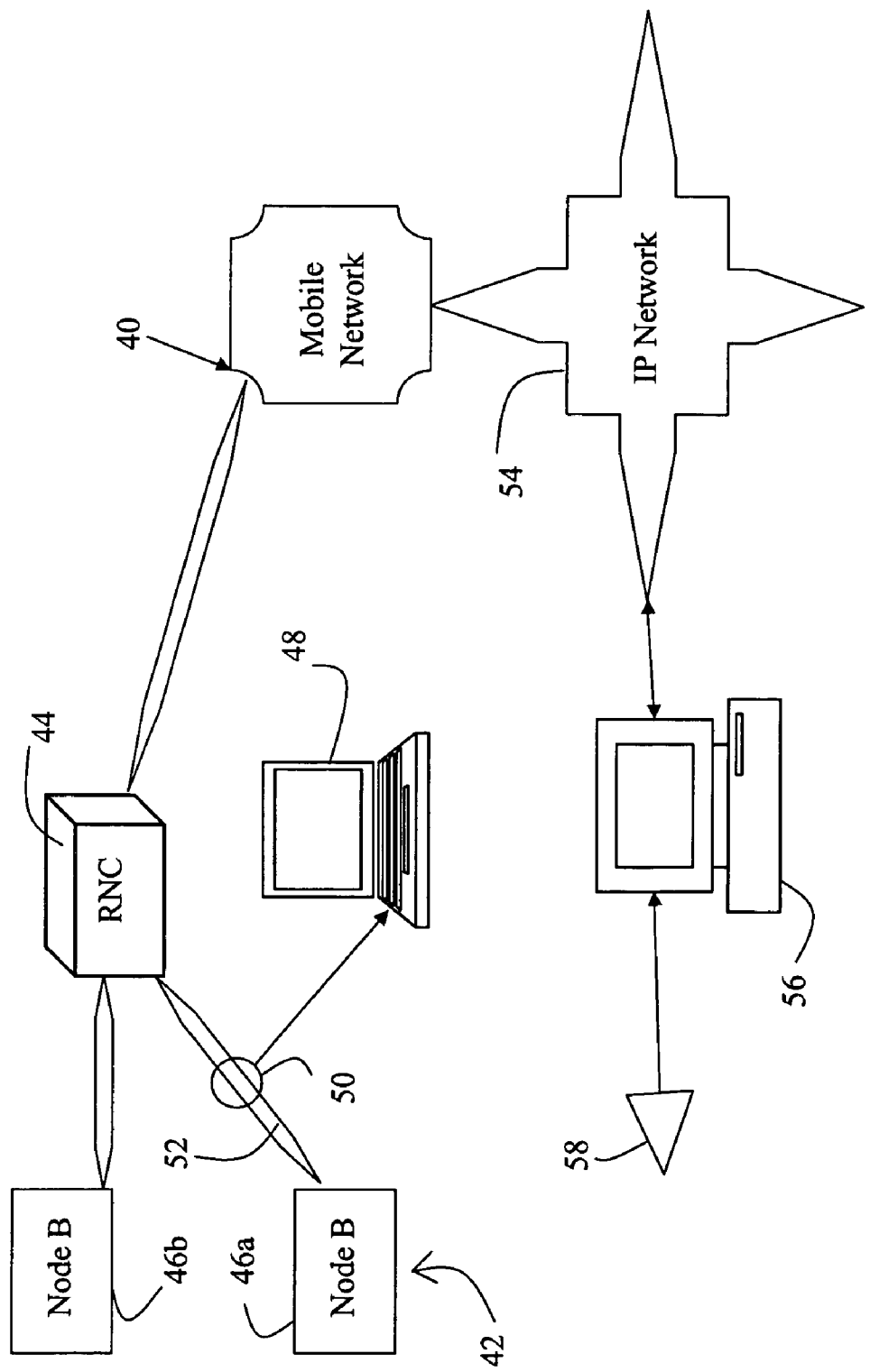
FIG. 3 is a block diagram of an upgraded telecommunications network coupled to a signaling analyzer in accordance with the process of the present invention.

FIG. 3 shows a mobile telecommunications network 40, which has been upgraded with a WCDMA radio link 42. Link 42 includes a radio network controller (RNC) 44 and several transmission/reception nodes (Node B) 46a, 46b. RNC 44 interfaces all telecommunications signals from radio link 42 with mobile network 40 and other applications.

A signaling analyzer 48 is shown connected through a probe 50 to Iub link 52, which interconnects a Node B 46a and RNC 44. Probe 50 provides access for signaling analyzer 48 to all signaling protocols which pass through Iub link 52. These various signals may include: asynchronous transfer mode (ATM) signals; QSALL signals between a Node B and a radio network controller (RNC); ALCAP signals between a Node B and an RNC; NBAP signals between a Node B and an RNC; RRC signals between a mobile device and an RNC; MM signals between a mobile device and a mobile network; CM signals between a mobile device and a mobile network; and application signals between a mobile device and an application server. Many of these signals are not normally seen by the mobile network and are therefore important for troubleshooting the new wireless interface to the mobile network.

The use of signaling analyzer 48 in conjunction with probe 50 provides extensive localized troubleshooting during the network expansion of the radio link. The root cause of communications failures can be more easily determined at the build-out location to significantly improve the speed of troubleshooting.

The mobile telecommunications network 40 may include database 54, wherein all signaling information from network 40 is collected for analysis. This collection process may make use of other probes 56 connected to different parts of the mobile network. Likewise, collected signaling data from analyzer 54 may be coupled to wireless quality database 54 for use in system analysis. Although a direct connection is shown between network 40 and database 54, any suitable coupling, such as an IP network, may be used.

Mobile network 40 may be coupled to and accessible through an IP Network 54. It may be specifically accessed by a service quality management system 56, either directly or through IP Network 54, as shown. A signaling database may be located either within mobile network 40 or within service quality management system 56, and adapted for recording either some or all of the signaling information that is used for rout9ing call data through network 40 and radio link 42. Data may be collected in system 56 either through mobile network 40 or through additional probes 58. The signaling data so recorded may be made available to signaling analyzer 48 for use in troubleshooting radio link 42. In this manner, a more accurate determination of the root cause of failure can be made.

Using the present process, the build-out of a new radio link 42 may be accomplished more efficiently by performing localized troubleshooting in accordance with the present invention. Once probe 50 and analyzer 48 are connected to an Iub link 52, predetermined telecommunications activities may be performed in the general area serviced by the respective Node B 46a, while collecting signaling information generated by those activities. The data may then be analyzed locally and immediate adjustments and corrections may be made to maximize the performance of the respective Node B 46a. this analysis may also be used to define the coverage area of Node B 46a and thereby improve its operation in conjunction with adjacent Node Bs 46b and the respective RNC 44. Even after an initial build-out, the process of the present invention may be used to maintain and enhance system performance.

The stored data may be used to calculate any variety of key performance indicators, including, but not limited to: service accessibility, setup time, speech quality and service retainability for telephony; service accessibility and service integrity for short message service; and service accessibility and retainability for multimedia message service.

In telephony, service accessibility is determined as the probability that an end user can access mobile telephony service when requested, once network access is available.

Service accessibility may optionally be determined in this manner within the stricter confines of specified tolerances and other given operating conditions.

The setup time in telephony is determined as the time between the sending of complete address information and receipt of a call setup notification. Optionally, setup time may be determined within the qualification of specific tolerances and other given operating conditions.

Speech quality may also be termed service integrity and is an indicator representing the quantification of end-to-end speech transmission quality on a per call basis.

Service retainability may also be determined as a call completion ratio or the probability that a service, once obtained, will continue to be provided under given conditions for a given time duration.

For Short Message Service (SMS), service accessibility is determined as the probability that the end user can access the service once network access is present. Service accessibility may also include a quality of service indicator in terms of access delay. This is determined as the time between sending a short message to an SMS center and receiving an acknowledgment from the SMS center.

For SMS, service integrity may be determined as an end-to-end delivery time and as a completion ratio. The end-to-end delivery time may be determined as the time between sending a short message to an SMS center and receiving the short message at a target mobile device. This presumes that a target mobile device is ready to receive. The completion ratio may be determined as the probability that the SMS messages will be delivered to the target destination under the given conditions, again assuming that the receiving target is ready to receive.

For Multimedia Message Service (MMS), service accessibility is calculated in terms of a send failure ratio, a send time, a retrieval failure ratio, and a retrieval time. An MMS failure ratio describes the probability that an MMS message cannot be sent by a subscriber although its is requested by pressing the send button. The MMS send time is the time elapsing from pressing the send button to the completion of the data transfer.

The MMS delivery failure ratio describes the probability that the MMS message cannot be down loaded by the mobile unit, which unit has previously received an MMS notification. The MMS retrieval time is the completion time of a download once the necessary network signaling is completed with the target mobile device.

In MMS, service retainability is determine by a notification failure ratio, a notification time, an end-to-end failure ratio, and an end-to-end delivery time. The notification failure ratio describes the probability that the MMS is not able to deliver notification of an MMS message to a target mobile device. The notification time is the time elapsing from the complete submission of the multimedia message to an MMS center to the reception of the notification by target mobile device.

The MMS end-to-end failure ratio describes the probability that the MMS is unable to deliver an MMS message after the send button is pushed or the sending party has not received an acknowledgement of the successful transmission. The MMS delivery time is the time elapsing from the pushing of the send button to the reception of the multimedia message by the target mobile device. This delivery time is not calculated if the message originating party has not received an acknowledgement of the successful transmission by the MMS center. Because the size of a multimedia message varies significantly, compared to an SMS message, message size can have a considerable impact on the submission time. For this reason, a typical sized multimedia message is used for making this measurement.

Common to all of the available services is the performance factor of network access, which depends a great deal upon wireless transmission factors in every location. A network access indicator may be more than just a signal strength indicator. It may act as a gate keeper to determine when to allow a user to select one of the available services. This determination can be based upon the statistical significance that a service can be used at a given confidence level. The network access indicator on a mobile device may also distinguish between circuit switched and packet switched networks. Network accessibility may be calculated as a probability that the mobile services are offered to an end customer by display of the network indicator on the mobile device.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for testing performance of a mobile telecommunications system, comprising the steps of:
   using a link probe for coupling a signaling analyzer to a mobile telecommunications link between a wireless network controller and a wireless transmission/reception station;
   performing predetermined telecommunications activities within the geographic area serviced by the mobile telecommunications link;
   collecting signaling information with said signal analyzer for the predetermined telecommunications activities coupled through the mobile telecommunications link;
   recording the collected signaling information in a telecommunications signaling analyzer database along with other signaling information from the mobile telecommunications system for the predetermined telecommunications activities; and
   analyzing recorded signaling information from said database to determine end-to-end performance values for the predetermined telecommunications activities.

2. The method of claim 1, wherein the predetermined telecommunications activities include telephony and further wherein a determined performance value includes measuring setup time.

3. The method of claim 2, wherein a determined performance value includes end-to-end speech quality.

4. The method of claim 2, wherein a determined performance value includes a probability that service access, once obtained, will continue to be provided under predetermined conditions for a predetermined time duration.

5. The method of claim 1, wherein the predetermined telecommunications activities include short message service (SMS) and further wherein a determined performance values include a time delay between sending a short message and receiving an acknowledgement from a short message center.

6. The method of claim 5, wherein a determined performance value includes and end-to-end delivery time between the sending of a short message and receipt of that message by a target mobile device, assuming that the target mobile device is ready to receive.

7. The method of claim 5, wherein a determined performance value includes a probability that SMS messages will be delivered to a target mobile device under predetermined conditions.

8. The method of claim 1, wherein the predetermined telecommunications activities include multimedia message service (MMS) and further wherein a determined performance value includes a probability that an MMS message can be sent by a subscriber when requested in the presence of network access.

9. The method of claim 8, wherein a determined performance value includes an elapsed time between a subscriber sending an MMS message and completion of data transfer for this MMS message.

10. The method of claim 1, further comprising the step of determining a root cause of failure for failed telecommunications activities from collected signaling information.

11. The method of claim 1, further comprising the steps of recording communications data corresponding to said signaling information from the performed telecommunications test activities and using recorded communications data to determine further performance values.

12. The method of claim 1, wherein the collected signaling information includes one or more of the following:
   asynchronous transfer mode (ATM) signals;
   QSALL signals between a WCDMA Node B and a radio network controller (RNC);

ALCAP signals between a WCDMA Node B and an RNC;
NBAP signals between a WCDMA Node B and an RNC;
RRC signals between a mobile device and an RNC;
MM signals between a mobile device and a wireless network;
CM signals between a mobile device and a wireless network; and
application signals between a mobile device and an application server.

* * * * *